United States Patent
Takabatake et al.

(10) Patent No.: US 12,344,094 B2
(45) Date of Patent: *Jul. 1, 2025

(54) DISPLAY CONTROL DEVICE FOR A VEHICLE, DISPLAY METHOD, PROGRAM, AND DISPLAY SYSTEM FOR A VEHICLE

(71) Applicant: TOYOTA JIDOSHA KABUSHIKI KAISHA, Toyota (JP)

(72) Inventors: Satoaki Takabatake, Nissin (JP); Koji Kimura, Nagoya (JP); Junji Miyazaki, Nagoya (JP); Ryo Ogata, Toyota (JP); Yuki Yoshida, Toyota (JP); Tadashi Morishita, Kariya (JP)

(73) Assignee: TOYOTA JIDOSHA KABUSHIKI KAISHA, Toyota (JP)

(*) Notice: Subject to any disclaimer, the term of this patent is extended or adjusted under 35 U.S.C. 154(b) by 0 days.

This patent is subject to a terminal disclaimer.

(21) Appl. No.: 18/731,990

(22) Filed: Jun. 3, 2024

(65) Prior Publication Data

US 2024/0317056 A1    Sep. 26, 2024

Related U.S. Application Data

(63) Continuation of application No. 17/384,978, filed on Jul. 26, 2021, now Pat. No. 12,024,015.

(30) Foreign Application Priority Data

Aug. 31, 2020    (JP) .................. 2020-146394

(51) Int. Cl.
*B60K 35/00*    (2024.01)
*B60K 35/23*    (2024.01)
(Continued)

(52) U.S. Cl.
CPC .......... *B60K 35/00* (2013.01); *G02B 27/0101* (2013.01); *G09G 5/14* (2013.01);
(Continued)

(58) Field of Classification Search
CPC ................ G09G 5/14; G09G 2340/00; G09G 2340/045; G09G 2340/12; G09G 2380/10;
(Continued)

(56) References Cited

U.S. PATENT DOCUMENTS

2003/0216880 A1    11/2003  Endoh
2014/0236483 A1    8/2014   Beaurepaire et al.
(Continued)

FOREIGN PATENT DOCUMENTS

JP    2018-103862 A    7/2018
JP    2019-090627 A    6/2019
(Continued)

OTHER PUBLICATIONS

Mar. 22, 2023 Office Action Issued in U.S. Appl. No. 17/384,978.
(Continued)

*Primary Examiner* — Grace Q Li
(74) *Attorney, Agent, or Firm* — Oliff PLC

(57) ABSTRACT

A display control device for a vehicle includes a memory and a processor connected to the memory. The processor is configured to display an object display and a lane display at a display section provided in a cabin of the vehicle. The object display depicts an object located in front of the vehicle, the lane display depicts a lane extending in front of the vehicle, and the object display and lane display are each displayed as a view thereof from the side of the object at which the vehicle is disposed. The processor is also configured to, in accordance with a distance between the object (Continued)

and the vehicle, alter a display ratio of the object display relative to a width of the lane display.

11 Claims, 12 Drawing Sheets

(51) Int. Cl.
*B60K 35/28* (2024.01)
*G02B 27/01* (2006.01)
*G09G 5/14* (2006.01)

(52) U.S. Cl.
CPC .............. *B60K 35/23* (2024.01); *B60K 35/28* (2024.01); *B60K 2360/179* (2024.01); *B60K 2360/27* (2024.01); *G02B 2027/014* (2013.01); *G02B 2027/0141* (2013.01); *G09G 2340/00* (2013.01); *G09G 2340/045* (2013.01); *G09G 2340/12* (2013.01); *G09G 2380/10* (2013.01)

(58) Field of Classification Search
CPC ...... B60K 2370/1529; B60K 2370/179; G02B 2027/014; G02B 2027/0141
See application file for complete search history.

(56) References Cited

U.S. PATENT DOCUMENTS

| | | |
|---|---|---|
| 2017/0343799 A1 | 11/2017 | Ito et al. |
| 2018/0118223 A1 | 5/2018 | Mori et al. |
| 2018/0178839 A1 | 6/2018 | Ide |
| 2018/0218713 A1 | 8/2018 | Kusanagi et al. |
| 2018/0330531 A1 | 11/2018 | Mullins |
| 2019/0071075 A1 | 3/2019 | Mimura |
| 2019/0144004 A1 | 5/2019 | Mimura et al. |
| 2020/0096776 A1 | 3/2020 | Hayashi et al. |
| 2022/0107201 A1 | 4/2022 | Yagyu et al. |

FOREIGN PATENT DOCUMENTS

| | | |
|---|---|---|
| JP | 2019-196082 A | 11/2019 |
| WO | 2017/158768 A1 | 9/2017 |

OTHER PUBLICATIONS

Sep. 20, 2023 Office Action Issued in U.S. Appl. No. 17/384,978.
Mar. 6, 2024 Notice of Allowance Issued in U.S. Appl. No. 17/384,978.

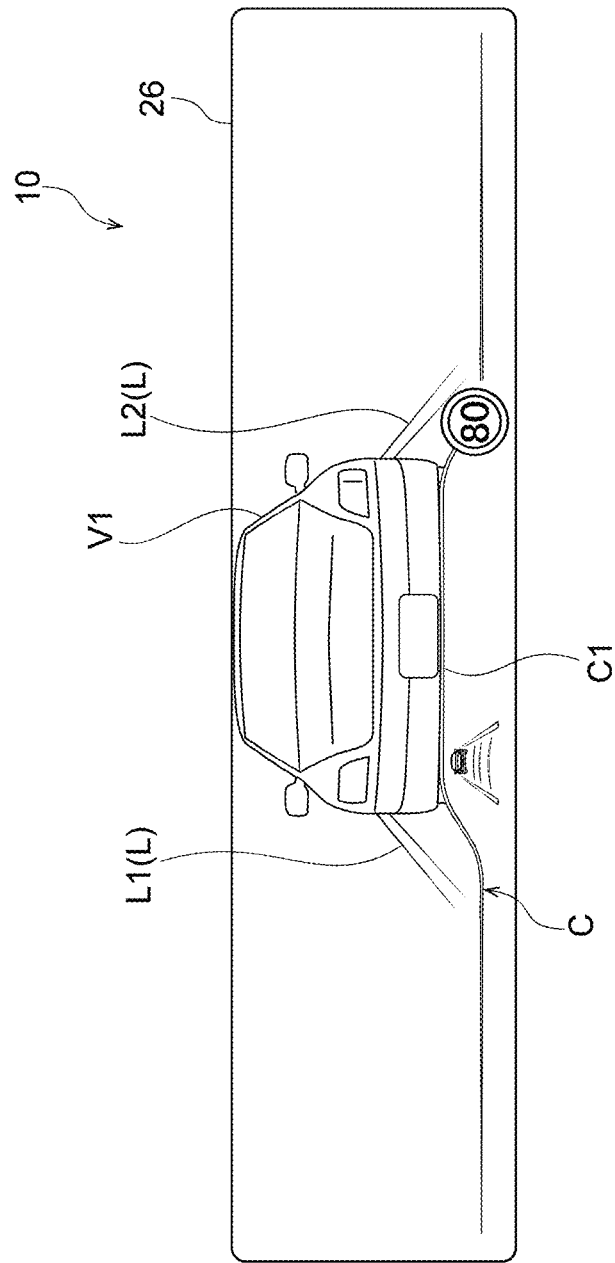

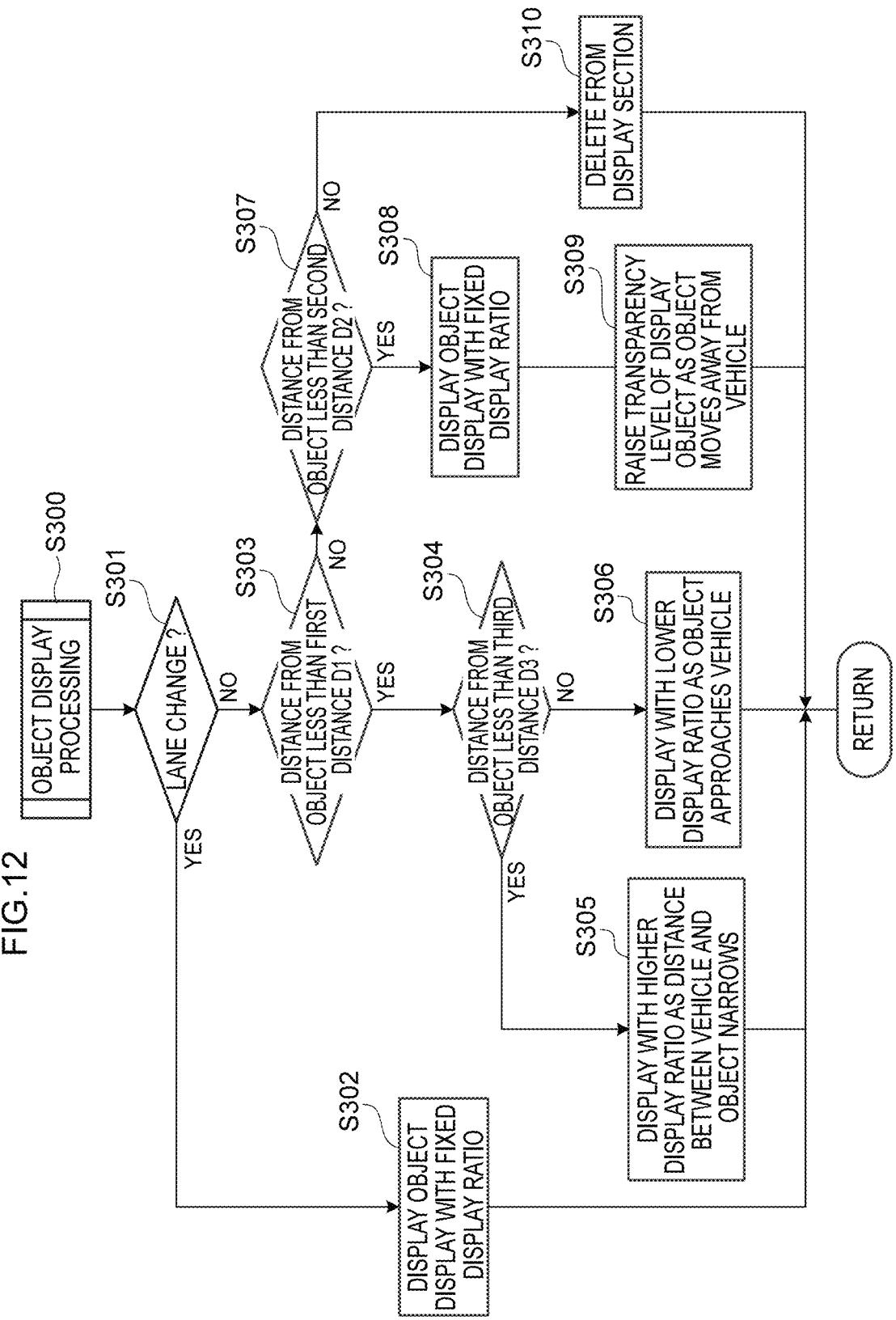

DISPLAY CONTROL DEVICE FOR A VEHICLE, DISPLAY METHOD, PROGRAM, AND DISPLAY SYSTEM FOR A VEHICLE

CROSS-REFERENCE TO RELATED APPLICATION

This is a continuation of U.S. patent application Ser. No. 17/384,978 filed Jul. 26, 2021 (now U.S. Pat. No. 12,024,015), which is based on and claims priority under 35 USC 119 from Japanese Patent Application No. 2020-146394 filed on Aug. 31, 2020. The disclosure of each of the above-identified prior applications is incorporated by reference herein in its entirety.

BACKGROUND

Technical Field

The present disclosure relates to a display control device for a vehicle, a display method, a program, and a display system for a vehicle.

Related Art

Japanese Patent Application Laid-Open (JP-A) No. 2019-090627 discloses a display device that, when driving assistance such as autonomous driving or the like is being conducted by control of a vehicle, displays images of a lane in which the present vehicle is running, the present vehicle, and an object (a vicinity vehicle) located in front of the present vehicle.

The display of the object is displayed larger when a distance between the present vehicle and the vicinity vehicle is smaller. By looking at the display device, a vehicle occupant may recognize a sense of distance between the present vehicle and the object.

However, if the size of an object is altered uniformly in accordance with distance from the present vehicle, the image of the object is likely to be displayed excessively large relative to an image of a lane and the like or, conversely, the image of the object is likely to be displayed so small as to be difficult to recognize. Therefore, it is desirable to adjust the size of an image of an object so as to be easier for a vehicle occupant to identify. However, the technology disclosed in JP-A No. 2019-090627 gives no consideration to this point.

SUMMARY

The present disclosure is made in consideration of the matter described above, and an object of the present disclosure is to provide a display control device for a vehicle, a display method, a program and a display system for a vehicle that may cause an object located in front of the vehicle to be displayed at suitable sizes.

A display control device for a vehicle according to a first aspect of the present disclosure includes a display control section that displays an object display and a lane display at a display section provided in a cabin of the vehicle, the object display depicting an object located in front of the vehicle, the lane display depicting a lane extending in front of the vehicle, and the object display and lane display each being displayed as a view thereof from the side of the object at which the vehicle is disposed, and that, in accordance with a distance between the object and the vehicle, alters a display ratio of the object display relative to a width of the lane display.

In the display control device for a vehicle according to the first aspect, the display section is provided in the cabin. The display control device for a vehicle includes the display control section. The display control section causes the display section to display, by the object display and lane display, an object located in front of the vehicle and a lane extending in front of the vehicle. The object display and the lane display are each displayed as seen from the vehicle side of the object. Therefore, because the object located in front of the vehicle and the lane are in the same view as a view for checking a scene in front of the vehicle from a driver seat, a vehicle occupant may recognize the object and the lane by looking at the display section.

The display control section alters the display ratio of the object display relative to the width of the lane display in accordance with distances between the object and the vehicle. Therefore, as required, a sense of distance between the vehicle and the object may be presented to the vehicle occupant in a form in which, for example, a positional relationship between the lane extending in front of the vehicle and the object is easy to recognize. Thus, in the display control device for a vehicle according to the first aspect, an object located in front of the vehicle may be displayed at suitable sizes.

In a display control device for a vehicle according to a second aspect of the present disclosure, in the structure according to the first aspect, the display control section lowers the display ratio of the object display relative to the width of the lane display in association with shortening of the distance between the object and the vehicle.

In the display control device for a vehicle according to the second aspect, the size of the object display relative to the width of the lane display is displayed smaller as the distance between the object and the vehicle shortens. Thus, when the object is close to the vehicle, the object display is not displayed excessively large relative to the lane display. Therefore, annoyance for the vehicle occupant looking at the display section may be suppressed.

In a display control device for a vehicle according to a third aspect of the present disclosure, in the structure according to the second aspect, the display control section lowers the display ratio of the object display relative to the width of the lane display in association with reduction of the distance between the object and the vehicle when the distance between the object and the vehicle is less than a first distance.

In the display control device for a vehicle according to the third aspect, when the distance between the object and the vehicle is less than the first distance, the size of the object display relative to the width of the lane display is displayed smaller as the distance between the object and the vehicle shortens. Therefore, for example, when the distance between an object and the vehicle is relatively narrow, a situation in which the object display is excessively large relative to the lane display and the vehicle occupant looking at the display section feels annoyance may be suppressed.

In a display control device for a vehicle according to a fourth aspect of the present disclosure, in the structure according to the second aspect or the third aspect, the display control section lowers the display ratio in association with narrowing of the distance between the object and the vehicle such that the object display is displayed at the display section inside the lane display at a position that does not overlap with the lane display.

In the display control device for a vehicle according to the fourth aspect, the object display is displayed inside the lane display at positions that do not overlap with the lane display. Thus, in a state in which an object is close to the vehicle, the lane display is not hidden by the object display. Therefore, the object in front of the vehicle and the shape of the lane may be suitably recognized.

In a display control device for a vehicle according to a fifth aspect of the present disclosure, in the structure according to any one of the first to fourth aspects, the display control section displays the object display at the display section superposed with a route display that displays an intended running route of the vehicle.

In the display control device for a vehicle according to the fifth aspect, the object display is displayed in a state of being superposed on the route display. Therefore, by looking at the display section, the vehicle occupant may easily recognize a positional relationship between the intended running route of the vehicle and the object.

In a display control device for a vehicle according to a sixth aspect of the present disclosure, in the structure according to any one of the first to fifth aspects, the display control section fixes the display ratio of the object display when the vehicle is conducting a lane change or lane change preparation.

In the display control device for a vehicle according to the sixth aspect, the display ratio of the object display is fixed in a screen that gives an alert to the vehicle occupant, such as when the vehicle is conducting a lane change or lane change preparation. Therefore, for example, when a lane change or lane change preparation is being conducted in a state in which an object is close to the vehicle, the display ratio may be specified such that the object display is emphasized relative to other displays such as the lane display and the like. Thus, when the vehicle is conducting a lane change or lane change preparation, the object display may be displayed at a suitable size so as to give an alert to the vehicle occupant.

In a display control device for a vehicle according to a seventh aspect of the present disclosure, in the structure according to any one of the third to sixth aspects, the display control section fixes the display ratio of the object display when the distance between the object and the vehicle is at least the first distance and less than a second distance, the second distance being longer than the first distance.

In the display control device for a vehicle according to the seventh aspect, when the distance between the object and the vehicle is at least the first distance but less than the second distance that is longer than the first distance, the display ratio of the object display is fixed. Thus, for example, when the distance between an object and the vehicle is sufficiently far, because the display ratio of the object display is fixed, cases of the object display being displayed excessively small may be suppressed. Therefore, by looking at the display section, the vehicle occupant may suitably recognize the object that is located at a position relatively far in front of the vehicle.

In a display control device for a vehicle according to an eighth aspect of the present disclosure, in the structure according to the seventh aspect, when the distance between the object and the vehicle is at least the first distance and less than the second distance, the display control section raises a transparency level of the object display in association with widening of the distance between the object and the vehicle.

In the display control device for a vehicle according to the eighth aspect, for example, when the distance between an object and the vehicle is sufficiently far, the object display may be displayed with a transparency level that is higher when the distance between the object and the vehicle is wider. Therefore, a sense of presence in the display section of an object that is far away from the vehicle and has a relatively low alert level for the vehicle occupant may be reduced. Thus, a vehicle occupant may efficiently recognize objects with higher alert levels by looking at the display section.

In a display control device for a vehicle according to a ninth aspect of the present disclosure, in the structure according to the seventh aspect or the eighth aspect, the display control section deletes the object display from the display section when the distance between the object and the vehicle is at least the second distance.

In the display control device for a vehicle according to the ninth aspect, when the distance between the object and the vehicle is the second distance or more, the object display is deleted from the display section. Thus, only a minimum of necessary information may be displayed at the display section.

In a display control device for a vehicle according to a tenth aspect of the present disclosure, in the structure according to any one of the third to ninth aspects, when the distance between the vehicle and the object is less than a third distance, the third distance being shorter than the first distance, the display control section raises the display ratio of the object display in association with narrowing of the distance between the object and the vehicle.

In the display control device for a vehicle according to the tenth aspect, when the distance between the object and the vehicle is less than the third distance and the vehicle is very close to the object, the display ratio of the object display is raised as the distance between the object and the vehicle narrows. Therefore, when the vehicle is very close to the object, the size of the object display relative to the lane display increases rapidly. Thus, by looking at the display section, the vehicle occupant may promptly recognize the object that is very close to the vehicle.

In a display control device for a vehicle according to an eleventh aspect of the present disclosure, in the structure according to any one of the first to tenth aspects, the display control section displays a front end display at a lower portion of a display region of the display section, the front end display depicting a position of a front end portion of the vehicle, and displays the lane display and the object display at the vehicle upper side of the front end display.

In the display control device for a vehicle according to the eleventh aspect, because the front end display is displayed in the lower portion of the display region of the display section, a sense of distance between the object and a hood (engine hood) of the vehicle may be recognized from a positional relationship between the object display and the front end display. Thus, by looking at the display section, the vehicle occupant may intuitively recognize a sense of distance between the vehicle and the object.

In a display control device for a vehicle according to a twelfth aspect of the present disclosure, in the structure according to any one of the first to eleventh aspects, the display section is provided to a vehicle front side of a driver seat, and the display section is a projection screen at a vehicle upper side of an instrument panel, the projection screen being projected onto by a head-up display device.

In the display control device for a vehicle according to the twelfth aspect of the present disclosure, because the display section is a projection screen provided at the vehicle upper side relative to the instrument panel at the vehicle front side of the driver seat, a vehicle occupant who is driving may recognize the object that is present in front of the vehicle without greatly moving their cycline. Moreover, because the object display may be displayed with a suitable size relative to the projection screen, cases of the object display being displayed excessively large are avoided. Therefore, when the vehicle occupant looks at the projection screen, a situation in which the vehicle occupant is confused by the object display may be suppressed.

A display method according to a thirteenth aspect of the present disclosure includes: displaying an object display and a lane display at a display section provided in a cabin of the vehicle, the object display depicting an object located in front of the vehicle, the lane display depicting a lane extending in front of the vehicle, and the object display and lane display each being displayed as a view thereof from the side of the object at which the vehicle is disposed; and, in accordance with a distance between the object and the vehicle, altering a display ratio of the object display relative to a width of the lane display.

In the display method according to the thirteenth aspect of the present disclosure, as described above, an object located in front of the vehicle may be displayed at suitable sizes.

A program according to a fourteenth aspect of the present disclosure causes a computer to execute processing including: displaying an object display and a lane display at a display section provided in a cabin of the vehicle, the object display depicting an object located in front of the vehicle, the lane display depicting a lane extending in front of the vehicle, and the object display and lane display each being displayed as a view thereof from the side of the object at which the vehicle is disposed; and, in accordance with a distance between the object and the vehicle, altering a display ratio of the object display relative to a width of the lane display.

With the program according to the fourteenth aspect, as described above, an object located in front of the vehicle may be displayed at suitable sizes.

A display system for a vehicle according to a fifteenth aspect of the present disclosure includes the display control device for a vehicle according to the first aspect and a display device.

In the display system for a vehicle according to the fifteenth aspect, an object located in front of the vehicle may be displayed at suitable sizes by the display device.

Advantageous Effects of Invention

According to the display control device for a vehicle according to the first aspect, an object located in front of the vehicle may be displayed at suitable sizes.

According to the display control device for a vehicle according to the second aspect or the third aspect, annoyance to a vehicle occupant looking at the display section may be suppressed.

According to the display control device for a vehicle according to the fourth aspect, an object in front of the vehicle and the shape of a road may be suitably recognized.

According to the display control device for a vehicle according to the fifth aspect, a positional relationship between an intended running path of the vehicle and an object may be easily recognized.

According to the display control device for a vehicle according to the sixth aspect, the object display may be displayed with a suitable size to give an alert to a vehicle occupant when the vehicle is conducting a lane change or lane change preparation.

According to the display control device for a vehicle according to the seventh aspect, an object located at a position that is relatively far in front of the vehicle may be suitably recognized.

According to the display control device for a vehicle according to the eighth aspect, objects with high alert levels may be more efficiently recognized.

According to the display control device for a vehicle according to the ninth aspect, only a minimum of necessary information may be displayed at the display section.

According to the display control device for a vehicle according to the tenth aspect, an object that is very close to the vehicle may be promptly recognized.

According to the display control device for a vehicle according to the eleventh aspect, a sense of distance between the vehicle and an object may be intuitively recognized.

According to the display control device for a vehicle according to the twelfth aspect, a vehicle occupant who is driving may recognize an object that is located in front of the vehicle without greatly moving their eyeline. In addition, a situation in which seeing the object display causes confusion may be suppressed.

According to the display method according to the thirteenth aspect, an object that is located in front of the vehicle may be displayed at suitable sizes.

According to the program according to the fourteenth aspect, an object that is located in front of the vehicle may be displayed at suitable sizes.

According to the display system for a vehicle according to the fifteenth aspect, an object located in front of the vehicle may be displayed at suitable sizes by the display device.

BRIEF DESCRIPTION OF THE DRAWINGS

Exemplary embodiments of the present disclosure will be described in detail based on the following figures, wherein:

FIG. 11 is a view showing a display example of the second display unit according to the another exemplary embodiment, which is a view showing a state in which a distance between a preceding vehicle and the vehicle is less than a third distance; and FIG. 12 is a flowchart showing an example of a flow of object display processing according to the another exemplary embodiment.

DETAILED DESCRIPTION

First Exemplary Embodiment

Figure 1:
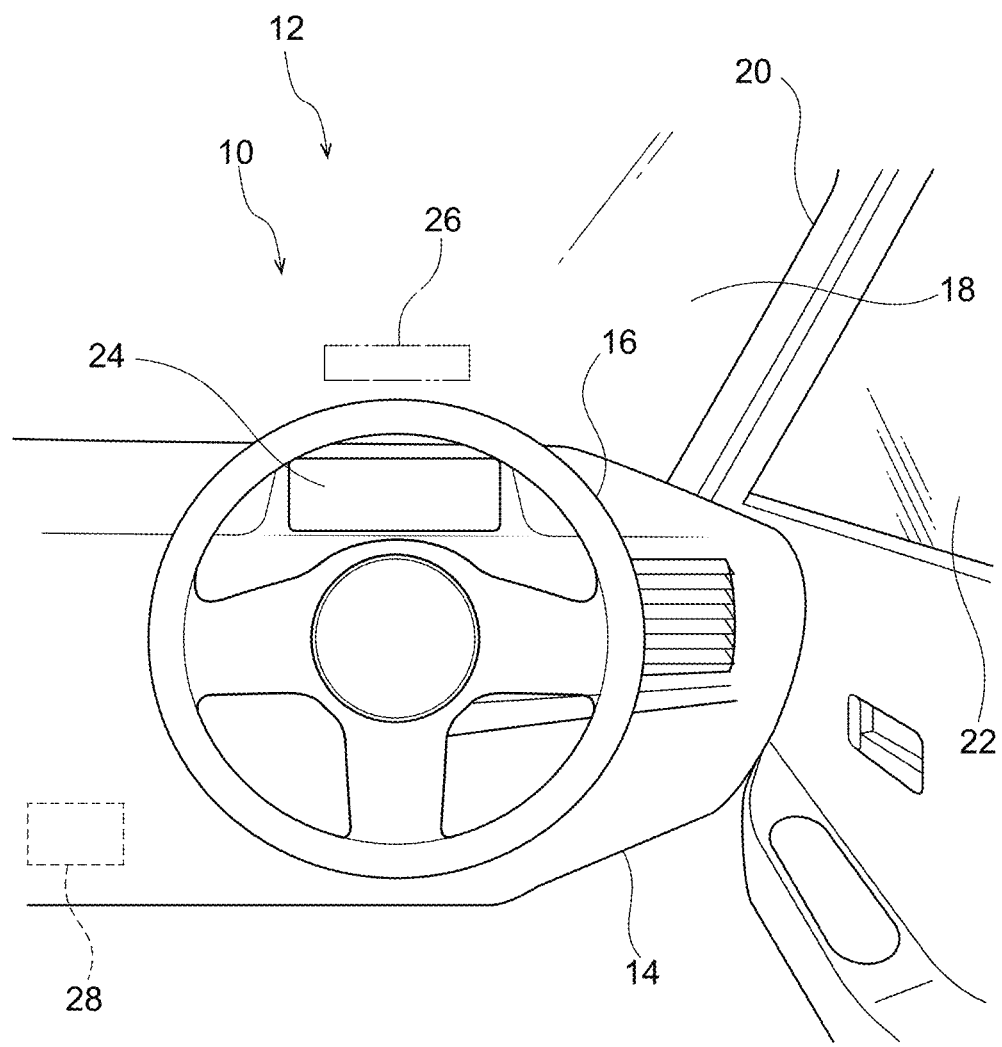
FIG. 1 is a schematic diagram of a front portion of a cabin interior of a vehicle in which a display control device for a vehicle according to an exemplary embodiment is employed, viewed from the vehicle rear side.

A display control device for a vehicle 10 according to a first exemplary embodiment is employed in a vehicle 12, which is described with reference to the drawings. As an example, the vehicle 12 according to the present exemplary embodiment is configured to be switchable between autonomous driving and manual driving. The meaning of the term "autonomous driving" as used herein is intended to include a running mode of the vehicle in which some or all of operations of acceleration, braking, direction indication, steering and the like are conducted autonomously. The meaning of the term "manual driving" is intended to include a running mode of the vehicle in which a driver executes all driving operations (operations of acceleration, braking, direction indication, steering and the like). As shown in FIG. 1, an instrument panel 14 is provided at a front portion of a cabin interior of the vehicle 12.

The instrument panel 14 extends in the vehicle width direction, and a steering wheel 16 is provided at the vehicle right side of the instrument panel 14. That is, the present exemplary embodiment is an example of a right-hand drive car in which the steering wheel 16 is provided at the right side and a driver seat is set at the vehicle right side.

A windshield glass 18 is provided at a front end portion of the instrument panel 14. The windshield glass 18 extends in the vehicle vertical direction and the vehicle width direction, dividing the cabin interior from the cabin exterior.

A vehicle right side end portion of the windshield glass 18 is fixed to a vehicle right side front pillar 20. The front pillar 20 extends in the vehicle vertical direction, and the windshield glass 18 is fixed to a vehicle width direction inner side end portion of the front pillar 20. A front end portion of a front side glass 22 is fixed to a vehicle width direction outer side end portion of the front pillar 20. A vehicle left side end portion of the windshield glass 18 is fixed to a vehicle left side front pillar, which is not shown in the drawings.

A first display unit 24 is provided at the instrument panel 14. The first display unit 24 is provided at the instrument panel 14 to the vehicle front of the driver seat. Thus, the first display unit 24 is provided at a location within a field of view of the driver in the state in which the eyeline of the driver is oriented to the vehicle front.

A second display unit 26 that serves as a display section is provided at the windshield glass 18. The second display unit 26 is provided at the vehicle upper side relative to the first display unit 24. The second display unit 26 is constituted by a projection screen that is projected onto by a head-up display (HUD) device 44 (see FIG. 2). Specifically, the head-up display device 44 is provided at the vehicle front side relative to the instrument panel 14, and the head-up display device 44 is structured to project images onto the second display unit 26 of the windshield glass 18.

—Hardware Structures of the Display Control Device for a Vehicle 10—

Figure 2:
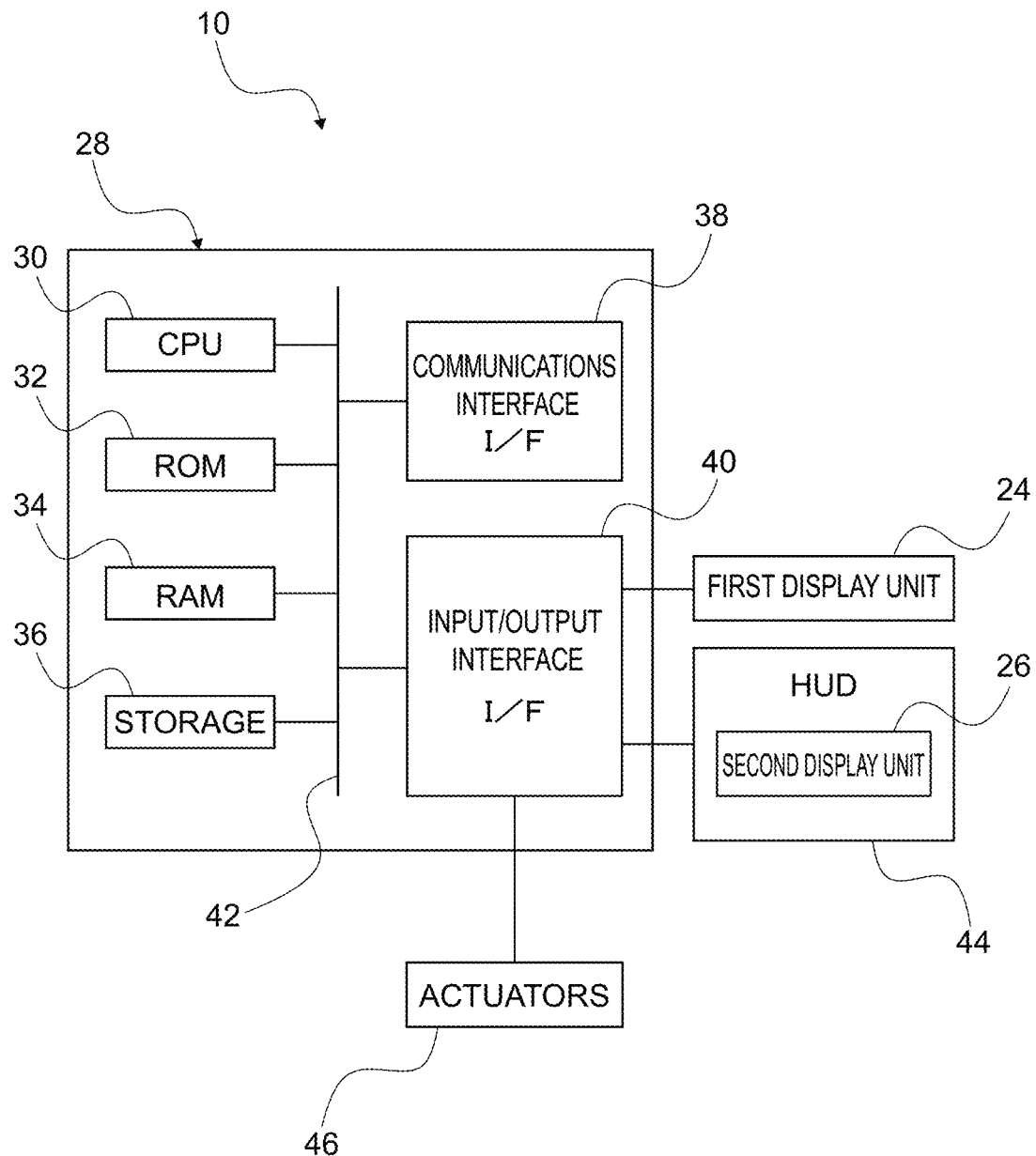
FIG. 2 is a block diagram showing hardware structures of a display control device for a vehicle according to the exemplary embodiment.

An electronic control unit (ECU) 28 that serves as a display control section is provided at the vehicle 12. FIG. 2 is a block diagram showing hardware structures of the display control device for a vehicle 10. As shown in FIG. 2, the ECU 28 of the display control device for a vehicle 10 includes a central processing unit (CPU) 30, read-only memory (ROM) 32, random access memory (RAM) 34, storage 36, a communications interface 38 and an input/output interface 40. These structures are connected to be capable of communicating with one another via a bus 42. The CPU 30 is an example of a processor, and the RAM 34 is an example of memory.

The CPU 30 is a central arithmetic processing unit that executes various programs and controls respective parts. That is, the CPU 30 reads a program from the ROM 32 or the storage 36, and executes the program using the RAM 34 as a workspace. The CPU 30 performs control of the structures described above and various kinds of computational processing in accordance with programs recorded in the ROM 32 or the storage 36.

The ROM 32 stores various programs and various kinds of data. The RAM 34 serves as a workspace, temporarily memorizing programs and data. The storage 36 includes a hard disk drive (HDD) or solid state drive (SSD). The storage 36 stores various programs, including an operating system, and various kinds of data. In the present exemplary embodiment, the ROM 32 or the storage 36 stores a program for implementing display processing, and various kinds of data and the like.

The communications interface 38 is an interface for the display control device for a vehicle 10 to communicate with a server and other equipment, which are not shown in the drawings. The communications interface 38 employs a standard such as, for example, Ethernet (registered trademark), LTE, FDDI, Wi-Fi (registered trademark) or the like.

The input/output interface 40 is connected with the first display unit 24, the head-up display device 44 that projects images onto the second display unit 26, and actuators 46. The actuators 46 include a steering actuator, an accelerator actuator and a brake actuator. The steering actuator conducts steering of the vehicle 12. The accelerator actuator conducts acceleration of the vehicle 12. The brake actuator conducts deceleration of the vehicle 12 by controlling a brake. Sensors, a GPS device and the like for allowing autonomous driving of the vehicle 12, which are not shown in the drawings, are connected to the input/output interface 40.

—Functional Structures of the Display Control Device for a Vehicle 10—

The display control device for a vehicle 10 uses the hardware resources described above to realize various functions. The functional structures realized by the display control device for a vehicle 10 are described with reference to FIG. 3.

Figure 3:
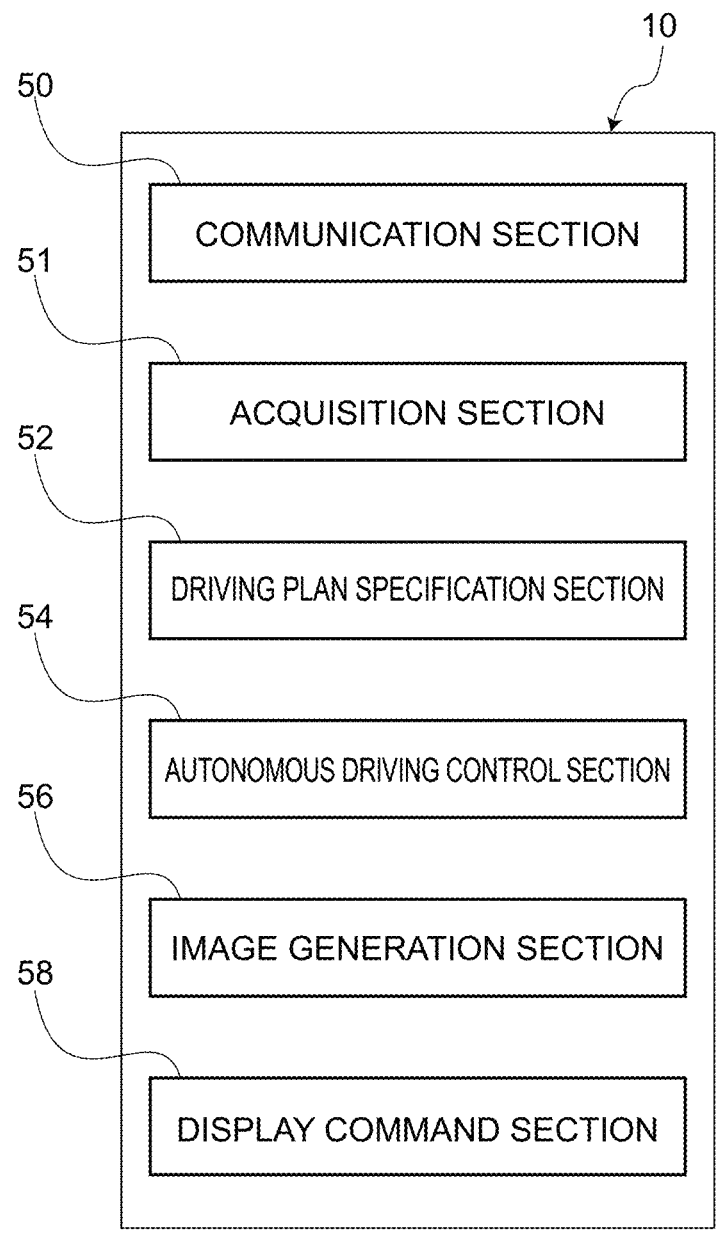
FIG. 3 is a block diagram showing functional structures of the display control device for a vehicle according to the exemplary embodiment.

As shown in FIG. 3, the display control device for a vehicle 10 includes, as functional structures, a communication section 50, an acquisition section 51, a driving plan specification section 52, an autonomous driving control section 54, an image generation section 56 and a display command section 58. These functional structures are realized by the CPU 30 reading and executing a program memorized in the ROM 32 or the storage 36.

The communication section 50 sends and receives data to and from the external server and other equipment via the communications interface 38. For example, the communication section 50 sends and receives data such as map data, traffic data and the like stored in a server. The communication section 50 is also configured to conduct vehicle-to-vehicle communications with vehicles in the vicinity.

Via the input/output interface 40, the acquisition section 51 acquires a running environment of the vehicle 12 that serves as vicinity information from external sensors, which are not shown in the drawings. The external sensors include cameras that image predetermined ranges, millimeter-wave radar that transmits probing waves in a predetermined range, and lidar (light detection and ranging/laser imaging detection and ranging) that scans a predetermined range. The vicinity information includes, for example, a width of a road on which the vehicle 12 is running, other vehicles running near the vehicle 12, obstacles and so forth.

The driving plan specification section 52 specifies a driving plan of the vehicle 12. More specifically, a destination location is entered by a vehicle occupant and the driving plan specification section 52 specifies a driving plan from a current location to the destination location.

The autonomous driving control section 54 causes autonomous driving of the vehicle 12 in accordance with the specified driving plan, taking account of position information and environment information of the vicinity of the vehicle 12. More specifically, the vehicle 12 is autonomously driven by control of the actuators 46.

The image generation section 56 generates images for display at the second display unit 26. In the present exemplary embodiment in particular, a preceding vehicle running in front of the vehicle 12 is displayed at the second display unit in plural forms according to distances between the preceding vehicle and the vehicle 12. The preceding vehicle is equivalent to an "object" of the present disclosure.

The display command section 58 includes a function for displaying images generated by the image generation section 56 at the second display unit 26, and a function for deleting images displayed at the second display unit 26. Below, functions of the image generation section 56 and display command section 58 are described with reference to FIG. 4 to FIG. 7.

Figure 4:
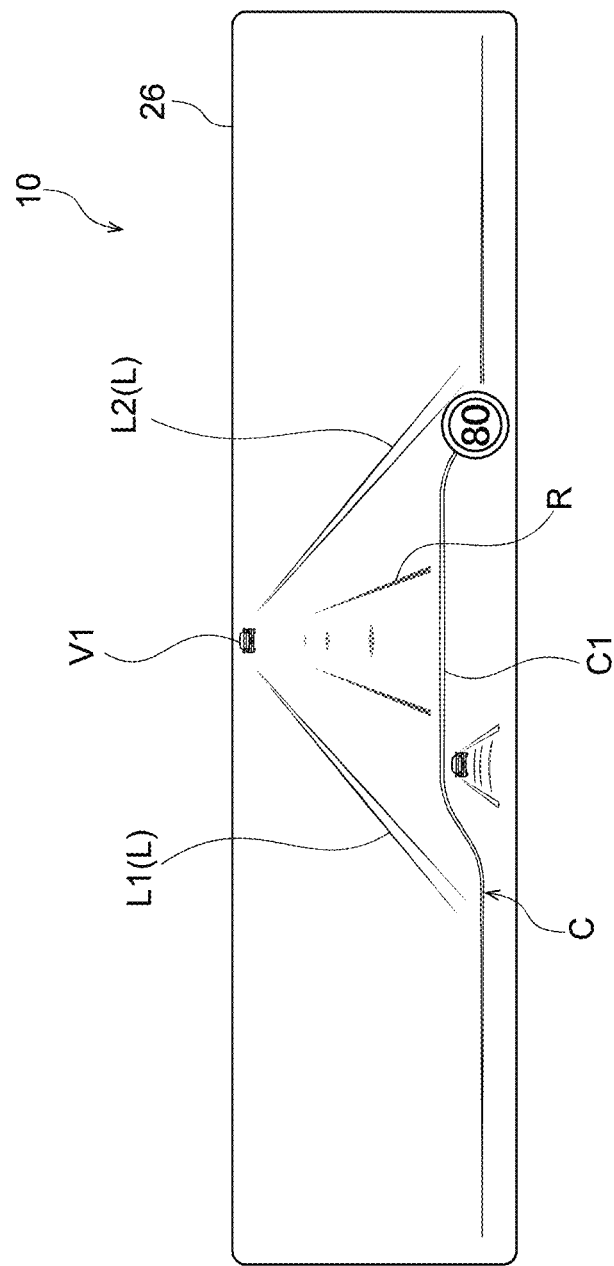
FIG. 4 is a view showing a display example of a second display unit that serves as a display section according to the exemplary embodiment, which is a view showing a state in which a distance between a preceding vehicle serving as an object and the vehicle is a first distance.

As shown in FIG. 4, an object display V1 and a lane display L are displayed at a central portion of a display region of the second display unit 26. The object display V1 is an image representing a preceding vehicle running in front of the vehicle 12. The lane display L is an image representing a lane extending in front of the vehicle 12. The lane display L is constituted by images L1 and L2 representing two lines that correspond to lines at both width direction sides of a lane in which the vehicle 12 is running. The images L1 and L2 represent the lane in perspective, with a spacing between the image L1 and image L2 progressively decreasing from the lower side to the upper side of an image region. Therefore, when the lane display L is seen, the lane appears to be extending in a depth direction of the display region (the vehicle front direction).

When the object display V1 is seen, the preceding vehicle is understood to be running in front of the vehicle 12 in the same lane. The object display V1 and the lane display L are images representing the lane and preceding vehicle in a view from the side of the preceding vehicle at which the vehicle 12 is disposed, that is, in a view from inside the cabin of the vehicle 12. The object display V1 is not limited to a preceding vehicle in the same lane as the vehicle 12 but may be an image representing a vehicle running diagonally forward of the present vehicle.

The object display V1 and lane display L are respectively displayed on the basis of information detected from any or a combination of the GPS device installed in the vehicle 12, map data, and the various sensors installed in the vehicle 12. For example, the position of the vehicle 12 may be detected by the GPS device installed in the vehicle 12. The lane extending in front of the vehicle 12 may be detected on the basis of position data of the vehicle 12 that is detected by the GPS device and map data. As sensors that detect preceding vehicles, sensors such as stereo cameras, an ultrasonic sensor, the millimeter-wave radar, laser radar and the like may be used in combination. Alternatively, the position of the present vehicle and positions of vehicles in the vicinity may be acquired by vehicle-to-vehicle communications with the vehicles in the vicinity.

A route display R is displayed superposed on the lane display L. The route display R is an image representing an intended running route of the vehicle 12 that is predicted on the basis of the running plan. For example, the route display R is a belt-shaped graphic in which plural dots representing equally spaced positions of the route are arranged along a center line. When the route display R shown in FIG. 4 is seen, it is understood that the vehicle 12 is intended to proceed directly along the lane in which the vehicle 12 is running.

A front end display C is displayed at a lower portion of a display region of the second display unit 26. The front end display C is an image representing the position of a front end portion of the vehicle 12. The front end display C is constituted by a linear graphic that extends in the width direction of the display region. A central region of the front end display C protrudes in a trapezoid shape towards the upper side. A protruding portion C1 in the trapezoid shape represents the shape of a hood (engine hood) at the front end portion of the vehicle 12. A relative positional relationship between the front end portion of the vehicle 12 and a preceding vehicle can be understood from a relative positional relationship between the protruding portion C1 and the object display V1.

In the present exemplary embodiment, the object display V1 is displayed with predetermined display ratios relative to widths of the lane display L (widths between the image L1 and the image L2). The display ratio is altered in accordance with the distance between the vehicle 12 and the preceding vehicle. Therefore, the size of the object display V1 is displayed in plural forms. Below, specific descriptions of the display forms of the object display V1 are given with reference to the schematic diagram in FIG. 5 and the display examples in FIG. 4, FIG. 6 and FIG. 7.

Figure 5:
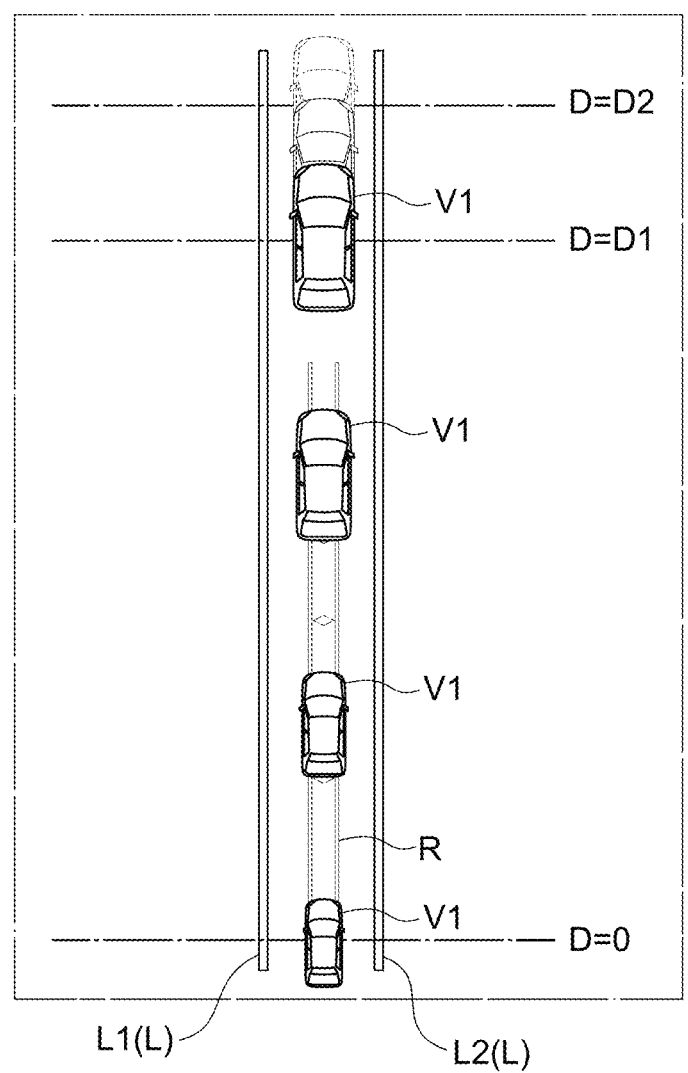
FIG. 5 is a schematic diagram for describing display forms of an object display according to the exemplary embodiment.

FIG. 5 is a schematic diagram in which the relationship between changes in the display ratio of the object display V1 relative to the width of the lane display L and distances D between the vehicle 12 and the preceding vehicle is seen in plan view. In this diagram, the position D=0 indicates a position at which the distance between the vehicle 12 and the preceding vehicle is 0 m. The distance D between the vehicle 12 and the preceding vehicle is, for example, a length of a line in plan view linking a center of the vehicle 12 with a center of the preceding vehicle. Therefore, if the distance between the vehicle 12 and the preceding vehicle was 0 m (D=0), this would be a state in which the vehicle 12 and the preceding vehicle were at overlapping positions in plan view, which would not be feasible in reality; this is an imagined reference position for calculating the distance between the vehicle 12 and the preceding vehicle.

In the present exemplary embodiment, when the distance between the vehicle 12 and the preceding vehicle is at least a first distance D1 but less than a second distance D2, the display ratio of the object display V1 relative to the width of the lane display L is fixed at a predetermined value. In specific terms, the display ratio is set to be equivalent to a size ratio at which the preceding vehicle fills the actual width of the lane in the width direction (a display ratio of 100%). The first distance D1 and the second distance D2 are set to, for example, D1=100 m and D2=115 m.

A region distant by at least 100 m but less than 115 m from the vehicle 12 corresponds to an upper end portion of the lane display L. Therefore, when a preceding vehicle is running at a distance of at least 100 m and less than 115 m from the vehicle 12, the width of the lane display L corresponding with the position of the object display V1 of the preceding vehicle is fixed at a predetermined value. Because the display ratio of the object display V1 relative to the width of the lane display L is fixed, the size of the object display V1 is maintained at a constant size. The size of the object display V1 in this situation is preferably set to a minimum size at which the object display V1 can be easily recognized as seen by an occupant of the driver seat. That is, when the distance D between the preceding vehicle and the vehicle 12 is 100 m or more, the size of the object display V1 in the second display unit 26 is maintained at a size that may be easily recognized by a vehicle occupant. Therefore, when looking at the second display unit 26, the vehicle occupant may recognize and not fail to notice the presence of the preceding vehicle. The display example shown in FIG. 4 is a display example of the second display unit 26 in a state in which the distance between the vehicle 12 and the preceding vehicle is the first distance D1.

As shown in FIG. 5, when the distance between the vehicle 12 and the preceding vehicle is at least the first distance D1 but less than the second distance D2, a transparency level of the object display V1 in the second display unit 26 is raised as the preceding vehicle moves further from the vehicle 12. Therefore, when the distance D between the preceding vehicle and the vehicle 12 is 100 m or more, the size of the object display V1 does not change but the transparency level of the object display V1 rises as the preceding vehicle moves away from the vehicle 12. Thus, a sense of presence of the object display V1 in the second display unit 26 is reduced.

When the distance between the vehicle 12 and the preceding vehicle is the second distance or more, the object display V1 is deleted from the second display unit 26, in order to push the attention of the vehicle occupant to other information that should be prioritized. That is, the object display V1 of a preceding vehicle that is at least 115 m away from the vehicle 12 is deleted from the second display unit 26.

When the distance between the vehicle 12 and the preceding vehicle is less than the first distance D1, the display ratio of the object display V1 relative to the width of the lane display L is lowered as the distance D between the preceding vehicle and the vehicle 12 shortens. In the present exemplary embodiment, the display ratio is at 100% when the distance D between the preceding vehicle and the vehicle is D=D1 (100 m). As the preceding vehicle approaches the vehicle 12, the display ratio is lowered. The display ratio is specified to be at 60% when the distance D is D=0 m.

Figure 6:
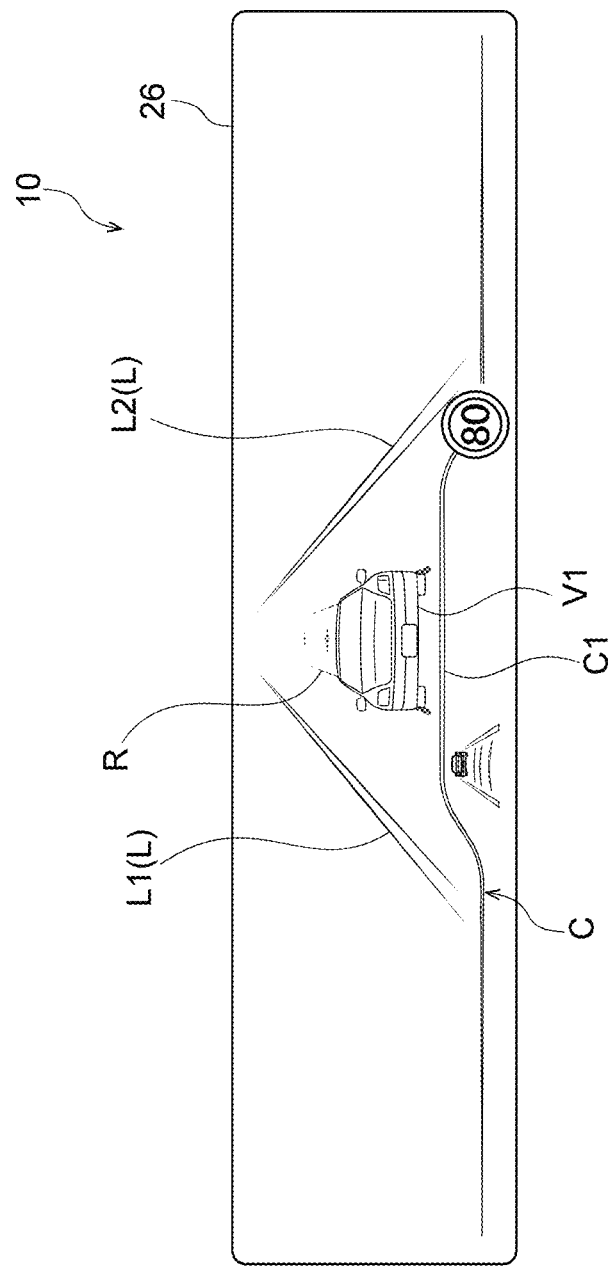
FIG. 6 is a view showing a display example of the second display unit according to the present exemplary embodiment, which is a view showing a state in which a distance between the preceding vehicle and the vehicle is less than the first distance.

For example, FIG. 6 shows a display example of the second display unit 26 when the vehicle 12 and the preceding vehicle are 10 m apart. As shown in FIG. 6, the width of the lane display L in the second display unit 26 is enlarged toward the vehicle 12. Meanwhile, as the preceding vehicle approaches the vehicle 12, the display ratio of the object display V1 relative to the width of the lane display L is lowered (see FIG. 5). Therefore, the object display V1 is progressively enlarged in association with the preceding vehicle approaching the vehicle 12, but the size of the lane display L that the object display V1 fills is decreased relative to the size of the actual lane that the preceding vehicle fills. Therefore, even when the distance D between the preceding vehicle and the vehicle 12 is relatively narrow, the object display V1 is displayed inside the lane display L with a size that does not overlap with the lane display L. Because the object display V1 is adjusted so as to be displayed inside the lane display L, cases of the size of the object display V1 relative to the size of the display region of the second display unit 26 becoming excessively large may be suppressed. Moreover, because the object display V1 is displayed so as not to overlap with the lane display L, the shape of the road in front of the vehicle can be understood.

In the present exemplary embodiment, when it is detected that the vehicle 12 is to conduct a lane change, the display ratio of the object display V1 relative to the width of the lane display L is fixed at a predetermined value. That is, the display ratio of the object display V1 is fixed at the predetermined value regardless of distance between the vehicle 12 and the preceding vehicle. Therefore, for example, when the preceding vehicle is running at a position less than the first distance D1 from the vehicle 12, processing to lower the display ratio of the object display V1 in the second display unit 26 is temporarily halted and the object display V1 is displayed at the predetermined display ratio relative to the width of the lane display L. The display ratio of the object display V1 in this situation is fixed at, for example 100%. That is, the display ratio of the object display V1 relative to the width of the lane display L is equivalent to the size ratio at which the preceding vehicle fills the actual width of the lane in the width direction.

Figure 7:
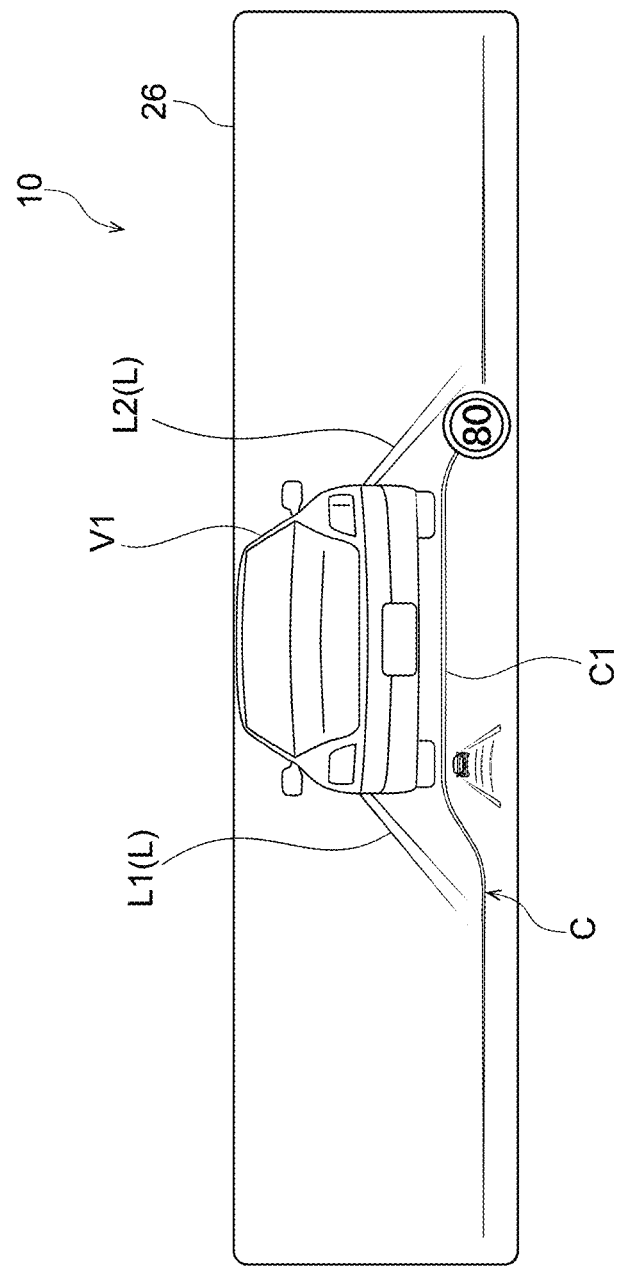
FIG. 7 is a view showing a display example of the second display unit according to the present exemplary embodiment, which is a view showing a state in which a distance between the preceding vehicle and the vehicle is less than the first distance when the vehicle is conducting a lane change or lane change preparation.

FIG. 7 shows a display example of the second display unit 26 when the vehicle 12 is conducting a lane change in a state in which, similarly to FIG. 6 described above, the vehicle 12 and the preceding vehicle are 10 m apart. As shown in FIG. 7, because the display ratio of the object display V1 is fixed at 100%, the object display V1 is displayed larger than in FIG. 6 even though the distance D between the preceding vehicle and the vehicle 12 is the same. In this state, because the object display V1 is enlarged, a portion of the object display V1 overlaps the lane display L and the object display V1 is displayed with priority over the lane display L. Thus, during the lane change, the object display V1 corresponding to the preceding vehicle running near the vehicle 12 is enlarged and displayed with priority. Therefore, an alert may be given to a vehicle occupant.

—Operation—

Now, operation of the present exemplary embodiment is described.

—Display Processing—

Figure 8:
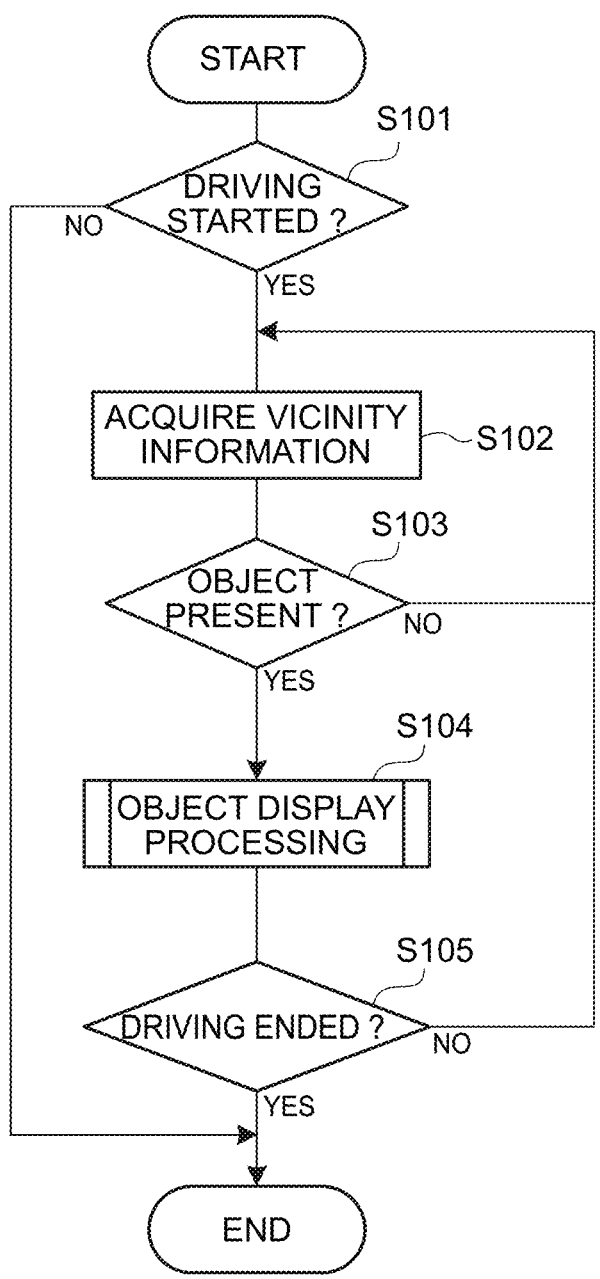
FIG. 8 is a flowchart showing an example of a flow of display processing according to the present exemplary embodiment.

An example of display processing that causes the second display unit 26 to display the object display V1 in association with the start of driving of the vehicle 12 is described using a flowchart shown in FIG. 8. The display processing is executed by the CPU 30 reading a display program from the ROM 32 or the storage 36, loading the program into the RAM 34 and executing the program.

As shown in FIG. 8, in step S101 the CPU 30 makes a determination as to whether driving of the vehicle 12 has started. When the vehicle 12 is running by autonomous driving, the CPU 30 makes the determination as to whether driving has started on the basis of whether or not control based on the functioning of the autonomous driving control section 54 has started in accordance with a driving plan specified by the driving plan specification section 52. When the vehicle 12 is running by manual driving, the CPU 30 makes the determination as to whether driving has started by, for example, whether or not an ignition switch of the vehicle is turned on.

When the CPU 30 determines in step S101 that driving has started, the CPU 30 proceeds to the processing of step S102. Alternatively, when the CPU 30 determines in step S101 that driving has not started, the CPU 30 ends the display processing.

In step S102, the CPU 30 acquires vicinity information of the vehicle 12. More specifically, on the basis of functioning of the acquisition section 51, the CPU 30 acquires information relating to the width of a road on which the vehicle 12 is running, vehicles running near the vehicle 12, obstacles and the like as the vicinity information.

In step S103, the CPU 30 makes a determination as to whether an object is present in front of the vehicle 12. More specifically, on the basis of the vicinity information acquired in step S102, the CPU 30 makes a determination as to whether a preceding vehicle is located in front of the vehicle 12.

When the CPU 30 determines in step S103 that an object is present, the CPU 30 proceeds to the processing of step S104. Alternatively, when the CPU 30 determines in step S103 that no object is present, the CPU 30 returns to step S102 and repeats the processing.

In step S104, the CPU 30 executes object display processing, displaying the object display V1 at the second display unit 26. Details of the object display processing are described below.

In step S105, the CPU 30 makes a determination as to whether driving of the vehicle 12 has ended. When the vehicle 12 is running by autonomous driving, the CPU 30 makes the determination as to whether driving of the vehicle 12 has ended by whether or not control based on the functioning of the autonomous driving control section 54 has ended. When the vehicle 12 is running by manual driving, the CPU 30 makes the determination as to whether driving of the vehicle 12 has ended by, for example, whether or not the ignition switch of the vehicle is turned off.

When the CPU 30 determines in step S105 that driving has ended, the CPU 30 ends the display processing. Alternatively, when the CPU 30 determines in step S105 that driving has not ended, the CPU 30 returns to step S102 and repeats the processing.

—Object Display Processing—

Now, an example of the object display processing is described with reference to FIG. 9. The object display processing is executed by the CPU 30 reading the display program from the ROM 32 or the storage 36, loading the program into the RAM 34 and executing the program.

Figure 9:
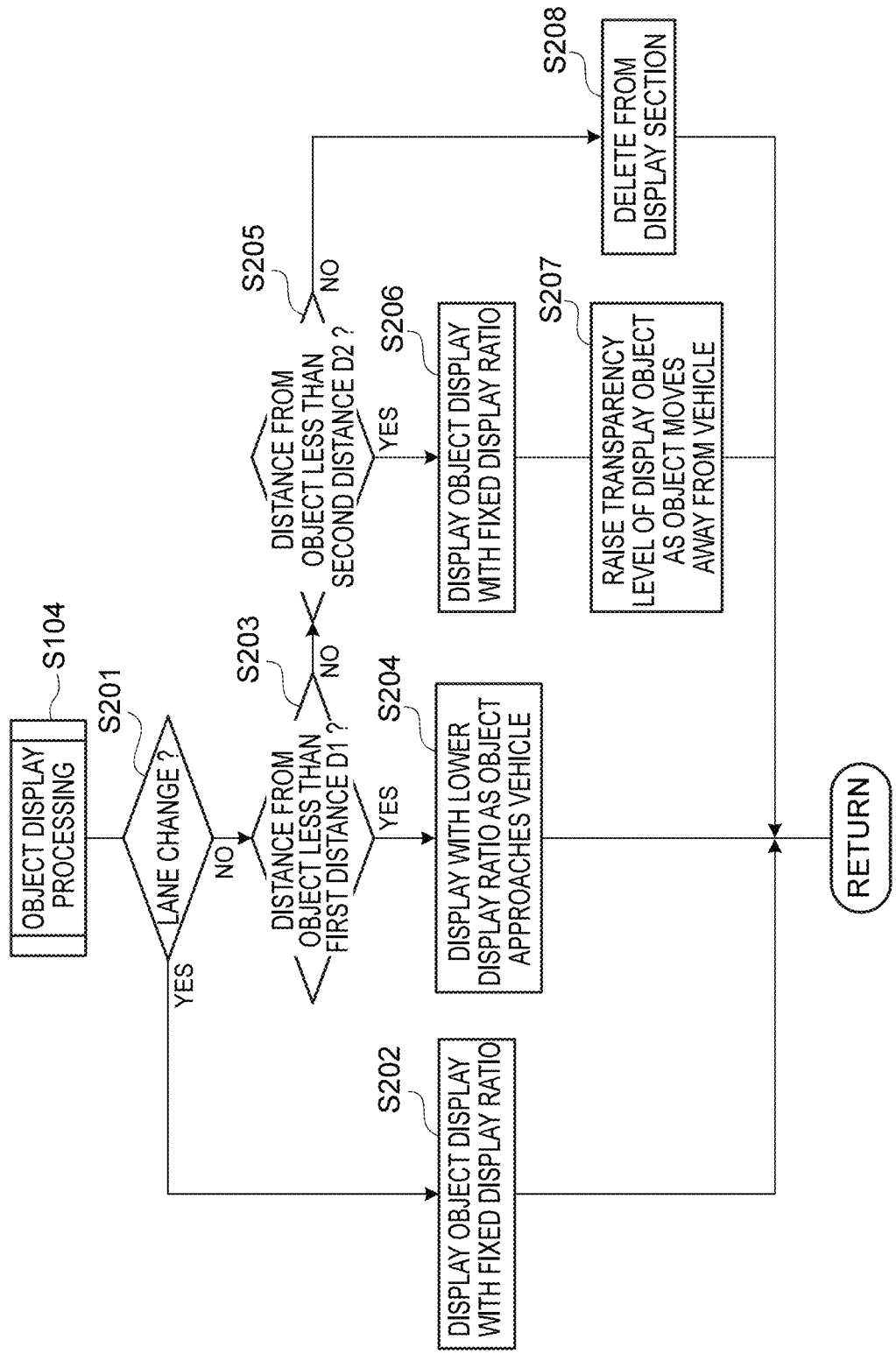
FIG. 9 is a flowchart showing the example of a flow of object display processing according to the present exemplary embodiment.

As shown in FIG. 9, in step S201 the CPU 30 makes a determination as to whether a lane change is being conducted. When making the determination as to whether a lane change is being conducted, the CPU 30 may determine whether or not a lane change of the vehicle 12 has started or may determine whether or not the vehicle 12 has started preparation for a lane change. In the present exemplary embodiment, the CPU 30 makes a determination as to whether a lane change of the vehicle 12 has started. To describe this more specifically, when the vehicle 12 is running by autonomous driving, the CPU 30 determines whether or not the vehicle 12 has started the lane change by the functioning of the autonomous driving control section 54. Alternatively, when the vehicle is running by manual driving, the CPU 30 makes a determination as to whether a lane change is being conducted (whether the vehicle 12 has changed course) on the basis of vicinity information of the vehicle 12 based on the functioning of the acquisition section 51.

When the vehicle 12 is making a determination as to whether preparation for a lane change has started, the CPU 30 may determine whether lane change preparation is being conducted as follows. For example, when the vehicle 12 is running by autonomous driving, by the functioning of the driving plan specification section 52, the CPU 30 makes a determination as to whether the vehicle 12 has passed a location at which a distance to a lane change target location is less than a predetermined distance. Alternatively, when the vehicle 12 is running by manual driving, the CPU 30 makes a determination as to whether a driver has operated a direction indicator.

When the CPU 30 determines in step S201 that a lane change is being conducted, the CPU 30 proceeds to the processing of step S202. Alternatively, when the CPU 30 determines in step S201 that no lane change is being conducted, the CPU 30 proceeds to the processing of step S203.

In step S202, the CPU 30 fixes the display ratio of the object display V1 relative to the lane display L and displays the object display V1 at the second display unit 26. In specific terms, the display ratio of the object display V1 is set to 100%. Hence, as shown in FIG. 7, the object display V1 of the preceding vehicle that is close to the vehicle 12 may be enlarged and, by being displayed with priority over the lane display L, may be emphasized relative to the lane display L. When the processing of step S202 is complete, the CPU 30 ends the object display processing.

In step S203, the CPU 30 makes a determination as to whether the distance D between the object and the vehicle 12 is less than the first distance D1. In specific terms, the CPU 30 makes a determination as to whether the distance D between the preceding vehicle and the vehicle 12 is less than 100 m.

When the CPU 30 determines in step S203 that the distance D between the object and the vehicle 12 is less than the first distance D1, the CPU 30 proceeds to the processing of step S204. Alternatively, when the CPU 30 determines in step S203 that the distance D between the object and the vehicle 12 is not less than the first distance D1, the CPU 30 proceeds to the processing of step S205.

In step S204, in association with narrowing of the distance between the object and the vehicle 12, the CPU 30 displays the object display V1 at the second display unit 26 with lowered display ratios. In specific terms, as shown in FIG. 5 and FIG. 6, the display ratio of the object display V1 is lowered in accordance with the distance D between the preceding vehicle and the vehicle 12 such that the display ratio would be 60% at a position at which the distance D between the preceding vehicle and the vehicle 12 was D=0 m. In this state, the object display V1 is displayed inside the lane display L at positions that do not overlap with the lane display L. When the processing of step S204 is complete, the CPU 30 ends the object display processing.

In step S205, the CPU 30 makes a determination as to whether the distance D between the object and the vehicle 12 is less than the second distance D2. In specific terms, the CPU 30 makes a determination as to whether the distance D between the preceding vehicle and the vehicle 12 is less than 115 m.

When the CPU 30 determines that the distance D between the object and the vehicle 12 is less than the second distance D2, the CPU 30 proceeds to the processing of step S206. Alternatively, when the CPU 30 determines that the distance D between the object and the vehicle 12 is at least the second distance D2, the CPU 30 proceeds to the processing of step S208.

In step S206, the CPU 30 fixes the display ratio of the object display V1 relative to the lane display L and displays the object display V1 at the second display unit 26. In specific terms, the display ratio of the object display V1 is set to 100%. Hence, as shown in FIG. 4, even when the preceding vehicle is 100 m or more away from the vehicle 12, the preceding vehicle is displayed as the object display V1 with a size large enough to be easily recognized by the vehicle occupant.

In step S207, in association with widening of the distance D between the object and the vehicle 12, the CPU 30 raises the transparency level of the object display V1. In specific terms, as shown in FIG. 5, as the distance D between the preceding vehicle and the vehicle 12 widens, the CPU 30 raises the transparency level and reduces the presence of the object display V1 of the preceding vehicle that is 100 m or more away from the vehicle 12. When the processing of step S207 is complete, the CPU 30 ends the object display processing.

Alternatively, in step S208, the CPU 30 deletes the object display V1 from the second display unit 26. In specific terms, the CPU 30 deletes the object display V1 of the preceding vehicle that is 115 m or more away from the vehicle 12 from the second display unit 26. When the processing of step S208 is complete, the CPU 30 ends the object display processing.

As described above, in the display control device for a vehicle 10 according to the present exemplary embodiment, a preceding vehicle in front of the vehicle 12 and a lane extending in front of the vehicle 12 are displayed at the second display unit 26 by the object display V1 and the lane display L. The object display V1 and the lane display L are shown in a view from the side of the preceding vehicle at which the vehicle 12 is disposed (the rear side). Therefore, by looking at the second display unit 26, a vehicle occupant may recognize the preceding vehicle and lane located in front of the vehicle in the same view as the view for checking the scene in front of the vehicle from the driver seat.

The display ratio of the object display V1 relative to the width of the lane display L is altered in accordance with the distance D between the preceding vehicle and the vehicle. Therefore, as required, a sense of distance between the vehicle 12 and the preceding vehicle may be presented to the vehicle occupant while the preceding vehicle is displayed in a form in which the positional relationship of the preceding vehicle with the lane is easy to recognize.

In specific terms, as shown in FIG. 5 and FIG. 6, when the distance between the preceding vehicle and the vehicle 12 is less than the first distance D1 (=100 m), the size of the object display V1 relative to the width of the lane display L is displayed smaller as the distance D between the preceding vehicle and the vehicle 12 shortens. Therefore, when the distance D between the preceding vehicle and the vehicle 12 is relatively narrow, a situation in which the object display V1 is excessively large relative to the lane display L and the vehicle occupant looking at the second display unit 26 feels annoyance may be suppressed. In particular, when the second display unit 26 is structured as a projection screen of the head-up display device 44 as in the present exemplary embodiment, the object display V1 might be displayed excessively large in the projection screen and the vehicle occupant seeing the object display V1 might be confused. Therefore, in this respect too, the present exemplary embodiment may suppress a situation which a vehicle occupant seeing the second display unit 26 feels annoyance.

In this state, the object display V1 is displayed inside the lane display L at positions that do not overlap with the lane display L. Therefore, the lane display L is not hidden by the object display V1 even in states in which the preceding vehicle is close to the vehicle. Therefore, both the preceding vehicle in front of the vehicle 12 and the shape of the lane may be suitably recognized.

When the distance D between the preceding vehicle and the vehicle 12 is at least the first distance D1 (=100 m) but less than the second distance D2 (=115 m), the display ratio of the object display V1 is fixed. Therefore, when the distance between the preceding vehicle and the vehicle 12 is sufficiently far, because the display ratio of the object display V1 is fixed, cases of the object display V1 being displayed excessively small may be suppressed. Therefore, by looking at the second display unit 26, the vehicle occupant may suitably recognize the preceding vehicle that is located at a position relatively far in front of the vehicle 12.

In this state, the transparency level of the object display V1 in the second display unit 26 is raised in association with widening of the distance between the preceding vehicle and the vehicle 12. Therefore, presence in the second display unit 26 of a preceding vehicle that is far away from the vehicle and has a relatively low alert level for the vehicle occupant may be reduced. Thus, the vehicle occupant may efficiently recognize other preceding vehicles and the like with higher alert levels by looking at the second display unit 26.

In the present exemplary embodiment, when the distance between the preceding vehicle and the vehicle 12 is at least the second distance D2 (=115 m), the object display V1 is deleted from the second display unit 26. Thus, only a minimum of necessary information may be displayed at the second display unit 26.

In the present exemplary embodiment, when the vehicle 12 conducts a lane change, the display ratio of the object display V1 is fixed. Therefore, as shown in FIG. 7, when the vehicle 12 is to conduct a lane change in a state in which a preceding vehicle is close to the vehicle 12, the display ratio may be specified such that the object display V1 is emphasized relative to other displays such as the lane display L and the like. Thus, when the vehicle 12 conducts the lane change, an alert may be given to the vehicle occupant.

In the present exemplary embodiment, the object display V1 is displayed in a state superposed with the route display R. Therefore, by looking at the second display unit 26, the vehicle occupant may easily recognize a positional relationship between the intended running path of the vehicle 12 and the preceding vehicle.

In the present exemplary embodiment, because the front end display C is displayed in the lower portion of the display region of the second display unit 26, a sense of distance between the preceding vehicle and the hood (engine hood) of the vehicle 12 may be recognized from a positional relationship between the object display V1 and the front end display C. Thus, by looking at the second display unit 26, the vehicle occupant may intuitively recognize a sense of distance between the vehicle 12 and the preceding vehicle.

According to the present exemplary embodiment, because the second display unit 26 is a projection screen provided at the vehicle upper side of the instrument panel 14 at the vehicle front side of the driver seat, a vehicle occupant who is driving may recognize the preceding vehicle located in front of the vehicle without greatly moving their eyeline.

Second Exemplary Embodiment

Below, a display control device for a vehicle 100 according to a second exemplary embodiment is described with reference to FIG. 10 to FIG. 12. Structural portions that are the same as in the first exemplary embodiment described above are assigned the same reference symbols and descriptions thereof are not given.

Figure 10:
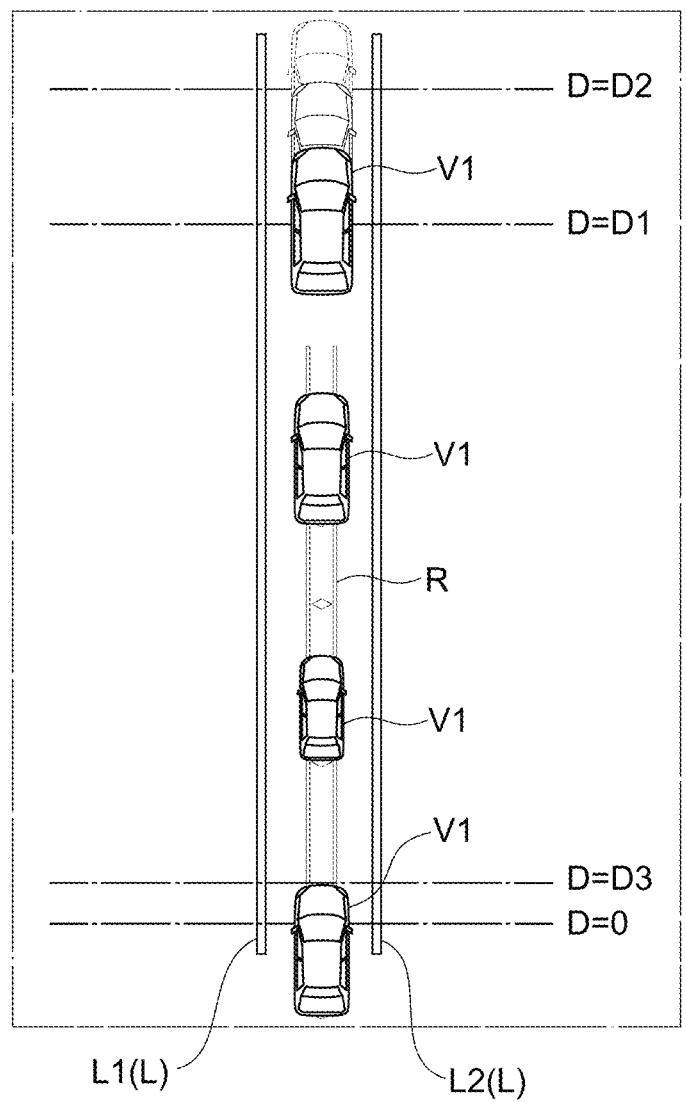
FIG. 10 is a schematic diagram for describing display forms of the object display according to another exemplary embodiment.

FIG. 10 is a schematic diagram in which a relationship between changes in the display ratio of the object display V1 relative to the width of the lane display L and distances D between the vehicle 12 and the preceding vehicle is seen in plan view. In the first exemplary embodiment, when the distance D between the preceding vehicle serving as an object and the vehicle 12 is less than the first distance D1 (=100 m), the display ratio of the object display V1 is lowered as the distance D between the preceding vehicle and the vehicle 12 narrows. In contrast, a characteristic of the second exemplary embodiment is that the display ratio of the object display V1 is raised when the distance D between the preceding vehicle and the vehicle 12 is less than a third distance D3, which is shorter than the first distance D1. Other structures are the same as in the first exemplary embodiment.

In the present exemplary embodiment, as an example, the third distance D3 is set to 5 m.

An example of object display processing according to the present exemplary embodiment that causes the second display unit 26 of the vehicle 12 to display the object display V1 is described using the flowchart shown in FIG. 12. The object display processing is executed by the CPU 30 reading the display program from the ROM 32 or the storage 36, loading the program into the RAM 34 and executing the program. The object display processing according to the present exemplary embodiment constitutes a portion of display processing that is the same as in the first exemplary embodiment.

The processing from step S301 to step S303 in FIG. 12 is the same as the processing from step S201 to step S203 in FIG. 9.

In step S304, the CPU 30 makes a determination as to whether the distance D between the object and the vehicle 12 is less than the third distance D3. In specific terms, the CPU 30 makes a determination as to whether the distance D between the preceding vehicle and the vehicle 12 is less than 5 m.

When the CPU 30 determines in step S304 that the distance D between the object and the vehicle 12 is less than the third distance D3, the CPU 30 proceeds to the processing of step S305. Alternatively, when the CPU 30 determines in step S304 that the distance D between the object and the vehicle 12 is at least the third distance D3, the CPU 30 proceeds to the processing of step S306.

In step S305, in association with narrowing of the distance between the object and the vehicle 12, the CPU 30 raises the display ratio of the object display V1 relative to width of the lane display L.

FIG. 11 shows a display example of the second display unit 26 when the distance D between the object and the vehicle 12 is 3 m. In this state, the object display V1 is displayed with a display ratio with a value exceeding 100%. Thus, the object display V1 is displayed larger than the width of the lane display L, and the state in which the vehicle 12 is very close to the preceding vehicle may be intuitively recognized.

The processing from step S306 to step S310 in FIG. 12 is the same as the processing from step S204 to step S208 in FIG. 9. Therefore, detailed descriptions are omitted here.

As described above, because the present exemplary embodiment basically follows the configuration of the display control device for a vehicle 10 according to the first exemplary embodiment, similar operation and effects may be provided.

In the present exemplary embodiment, when the distance between the preceding vehicle and the vehicle 12 is less than the third distance D3 (=5 m) and the vehicle 12 is very close to the preceding vehicle, the display ratio of the object display V1 is raised as the distance D between the preceding vehicle and the vehicle 12 narrows. Therefore, when the vehicle 12 is very close to the preceding vehicle, the size of the object display V1 relative to the lane display L increases rapidly, and the object display V1 is displayed in a form that is emphasized relative to the lane display L. Thus, by looking at the second display unit 26, the vehicle occupant may promptly recognize that the preceding vehicle is very close to the vehicle 12.

Supplementary Descriptions

The exemplary embodiments described above have configurations in which, when the distance D between an object and the vehicle 12 is less than the first distance D1, the display ratio of the object display V1 is lowered as the distance D narrows (shortens), but this is not limiting. That is, a method of lowering the display ratio of the object display V1 is not limited to continuous lowering but may be a method of lowering the display ratio in steps. For example, a configuration is possible that lowers the display ratio stepwise by a predetermined ratio step each time the distance D narrows by a predetermined distance.

The values of the first distance D1, the second distance D2 and the third distance D3 in the exemplary embodiments described above are merely examples and may be suitably modified within a scope that does not depart from the gist of the invention.

The display processing and object display processing that, in the exemplary embodiments described above, are executed by the CPU reading software (a program) may be executed by various kinds of processor other than a CPU. Examples of processors in these cases include a PLD (programmable logic device) in which a circuit configuration can be modified after manufacturing, such as an FPGA (field programmable gate array) or the like, a dedicated electronic circuit which is a processor with a circuit configuration that is specially designed to execute specific processing, such as an ASIC (application-specific integrated circuit) or the like, and so forth. The display processing and object display processing may be executed by one of these various kinds of processors, and may be executed by a combination of two or more processors of the same or different kinds (for example, plural FPGAs, a combination of a CPU with an FPGA, or the like). Hardware structures of these various kinds of processors are, to be more specific, electronic circuits combining circuit components such as semiconductor components and the like.

In the exemplary embodiments described above, a mode is described in which the program of the display processing and object display processing is memorized in advance (installed) at the ROM or the storage, but this is not limiting. The program may be provided in a mode recorded on a recording medium, such as a CD-ROM (compact disc read-only memory), DVD-ROM (digital versatile disc read-only memory), USB (universal serial bus) memory or the like. Modes are also possible in which the program is downloaded from external equipment via a network.

What is claimed is:

1. A display control device for a vehicle, the display control device comprising a memory and a processor coupled to the memory, the processor being configured to:
   display an object display and a lane display at a display section provided in a cabin of the vehicle, the object display depicting an object located in front of the vehicle, the lane display depicting a lane extending in front of the vehicle, and the object display and the lane display each being displayed as a view thereof from a side of the object at which the vehicle is disposed,
   change a display position of the object display along the lane display according to a distance between the object and the vehicle so that the display position of the object display moves toward an upper end of the lane display as the distance between the object and the vehicle increases,
   when the vehicle is not conducting a lane change or lane change preparation, change a size of the object display as the distance between the object and the vehicle changes and as the display position of the object display along the lane display changes, so that a display ratio of the object display relative to a width of the lane display at the display position of the object display increases as the distance between the object and the vehicle increases so that as the distance between the object and the vehicle increases, the object display occupies a larger percentage of the width of the lane display, and
   when the vehicle is conducting the lane change or the lane change preparation, fix the display ratio of the object display relative to the width of the lane display to a predetermined value regardless of the distance between the object and the vehicle.

2. The display control device according to claim 1, wherein, when the vehicle is not conducting the lane change or the lane change preparation, the processor is configured to lower the display ratio of the object display relative to the width of the lane display as the distance between the object and the vehicle decreases when the distance between the object and the vehicle is less than a first distance.

3. The display control device according to claim 2, wherein, when the vehicle is not conducting the lane change or the lane change preparation, the processor is configured to fix the display ratio of the object display relative to the width of the lane display when the distance between the object and the vehicle is at least the first distance and less than a second distance, the second distance being longer than the first distance.

4. The display control device according to claim 3, wherein, when the vehicle is not conducting the lane change or the lane change preparation, the processor is configured to, when the distance between the object and the vehicle is at least the first distance and less than the second distance, raise a transparency level of the object display in association with increasing of the distance between the object and the vehicle.

5. The display control device according to claim 3, wherein, when the vehicle is not conducting the lane change or the lane change preparation, the processor is configured to delete the object display from the display section when the distance between the object and the vehicle is at least the second distance.

6. The display control device according to claim 2, wherein, when the vehicle is not conducting the lane change or the lane change preparation, the processor is configured to, when the distance between the vehicle and the object is less than a third distance, the third distance being shorter than the first distance, raise the display ratio of the object display relative to the width of the lane display as the distance between the object and the vehicle decreases.

7. The display control device according to claim 1, wherein, when the vehicle is not conducting the lane change or the lane change preparation, the processor is configured to lower the display ratio of the object display relative to the width of the lane display as the distance between the object and the vehicle decreases so that the object display is displayed at the display section inside the lane display at a position that does not overlap with the lane display.

8. The display control device according to claim 1, wherein the processor is configured to display the object display, at the display section, superposed with a route display that displays an intended running route of the vehicle.

9. The display control device according to claim 1, wherein the processor is configured to:
   display a front end display at a lower portion of a display region of the display section, the front end display depicting a position of a front end portion of the vehicle, and
   display the lane display and the object display at a vehicle upper side of the front end display.

10. The display control device according to claim 1, wherein the display section is provided to a vehicle front side of a driver seat of the vehicle, and the display section is a projection screen at a vehicle upper side of an instrument panel of the vehicle, the projection screen being projected onto by a head-up display device.

11. A display system for a vehicle, the display system comprising:
   the display control device according to claim 1; and
   a display device including the display section.

* * * * *